US011567354B2

(12) United States Patent
Hiramoto et al.

(10) Patent No.: US 11,567,354 B2
(45) Date of Patent: Jan. 31, 2023

(54) DISPLAY DEVICE (71) Applicant: Japan Display Inc., Tokyo (JP)

(72) Inventors: Koji Hiramoto, Tokyo (JP); Norika Ikeda, Tokyo (JP); Ken Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/370,186

(22) Filed: Jul. 8, 2021

(65) Prior Publication Data

US 2021/0333613 A1 Oct. 28, 2021

Related U.S. Application Data (63) Continuation of application No. PCT/JP2019/049010, filed on Dec. 13, 2019.

(30) Foreign Application Priority Data

Jan. 11, 2019 (JP) .............................. JP2019-003533
Jan. 11, 2019 (JP) .............................. JP2019-003534

(51) Int. Cl.
*G02F 1/1333* (2006.01)
*G02F 1/133* (2006.01)
*G02F 1/13357* (2006.01)

(52) U.S. Cl.
CPC .... *G02F 1/133314* (2021.01); *G02F 1/13318* (2013.01); *G02F 1/13332* (2021.01); *G02F 1/13338* (2013.01); *G02F 1/133331* (2021.01); *G02F 1/133615* (2013.01)

(58) Field of Classification Search
CPC ........... G02F 1/133314; G02F 1/13332; G02F 1/133308; G02F 1/133331; G02F 1/13318; G02F 1/13338; G02F 1/133615; G03B 17/563; F16M 13/00; F16M 13/005; F16M 13/04
See application file for complete search history.

(56) References Cited

U.S. PATENT DOCUMENTS

2004/0201578 A1  10/2004  Sadahiro
2009/0295976 A1  12/2009  Choi
2014/0168263 A1*  6/2014  Avci .................. G06T 11/60
                                            345/633

(Continued)

FOREIGN PATENT DOCUMENTS

CN   207623667 U   7/2018
JP   S55-109889 U  8/1980

(Continued)

OTHER PUBLICATIONS

International Search Report issued in International Patent Application No. PCT/JP2019/049010 dated Mar. 17, 2020 and English translation of same. 10 pages.

(Continued)

*Primary Examiner* — Jia X Pan
(74) *Attorney, Agent, or Firm* — K&L Gates LLP (57) ABSTRACT

According to an embodiment, a display device comprises a frame defining an opening, a grip extending from the frame, and a display panel which is held by the frame and whose background is visually recognizable. Further, the opening includes a region surrounded by an inner edge of the frame and the display panel.

17 Claims, 11 Drawing Sheets

(56) References Cited

U.S. PATENT DOCUMENTS

| | | |
|---|---|---|
| 2017/0255072 A1* | 9/2017 | Kaneko .................. G02F 1/137 |
| 2017/0261809 A1 | 9/2017 | Mizuno et al. |
| 2018/0164033 A1 | 6/2018 | Lee |
| 2020/0057330 A1* | 2/2020 | Yamazaki ............. G02F 1/1333 |

FOREIGN PATENT DOCUMENTS

| | | | |
|---|---|---|---|
| JP | 2003-158652 A | | 5/2003 |
| JP | 2004-264516 A | | 9/2004 |
| JP | 2004-317585 A | | 11/2004 |
| JP | 2005-331668 A | | 12/2005 |
| JP | 2017-167214 A | | 9/2017 |
| KR | 20160074995 A | * | 6/2016 |

OTHER PUBLICATIONS

Written Opinion issued in International Patent Application No. PCT/JP2019/049010 dated Mar. 17, 2020. 6 pages.
English Translation of Office Action issued in related Japanese Patent Application No. 2019-003533 dated Sep. 6, 2022. 4 pages.
English Translation of Office Action issued in related Japanese Patent Application No. 2019-003534 dated Sep. 6, 2022. 3 pages.

* cited by examiner

DISPLAY DEVICE

CROSS-REFERENCE TO RELATED APPLICATIONS

This application is a Continuation Application of PCT Application No. PCT/JP2019/049010 filed Dec. 13, 2019 and based upon and claiming the benefit of priority from Japanese Patent Application No. 2019-003533, filed Jan. 11, 2019; and No. 2019-003534, filed Jan. 11, 2019, the entire contents of all of which are incorporated herein by reference.

FIELD

Embodiments of the present invention relate to a display device.

BACKGROUND

Recently, various transparent displays with a visible background have been proposed. For example, a display device using a polymer dispersed liquid crystal capable of switching a scattering state in which incident light is scattered and a transmissive state in which incident light is transmitted has been proposed.

SUMMARY

The present disclosure relates generally to a display device. According to an embodiment, a display device comprises a frame defining an opening, a grip extending from the frame, and a display panel which is held by the frame and whose background is visually recognizable. Further, the opening includes a region surrounded by an inner edge of the frame and the display panel.

DETAILED DESCRIPTION

In general, according to an embodiment, a display device comprises a frame defining an opening, a grip extending from the frame, and a display panel which is held by the frame and whose background is visually recognizable. Further, the opening includes a region surrounded by an inner edge of the frame and the display panel.

According to another embodiment, a display device comprises a frame defining an opening, a rod-shaped grip extending from the frame, a display panel which is held by the frame and whose background is visually recognizable, a switch arranged between the grip and the opening, and a detection device executing a detection operation of an object, based on an operation of the switch. Further, the detection device is arranged between the switch and the opening, on a side opposite to the switch.

According to these configurations, a display device available as a new application can be provided.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

In the present embodiment, a display device using a liquid crystal display element will be exemplified. However, the present embodiment does not prevent application of individual technical ideas disclosed in the embodiments to display devices comprising the other types of display elements. For example, one of the other types of display elements is an organic electroluminescent (EL) display element.

Figure 1:
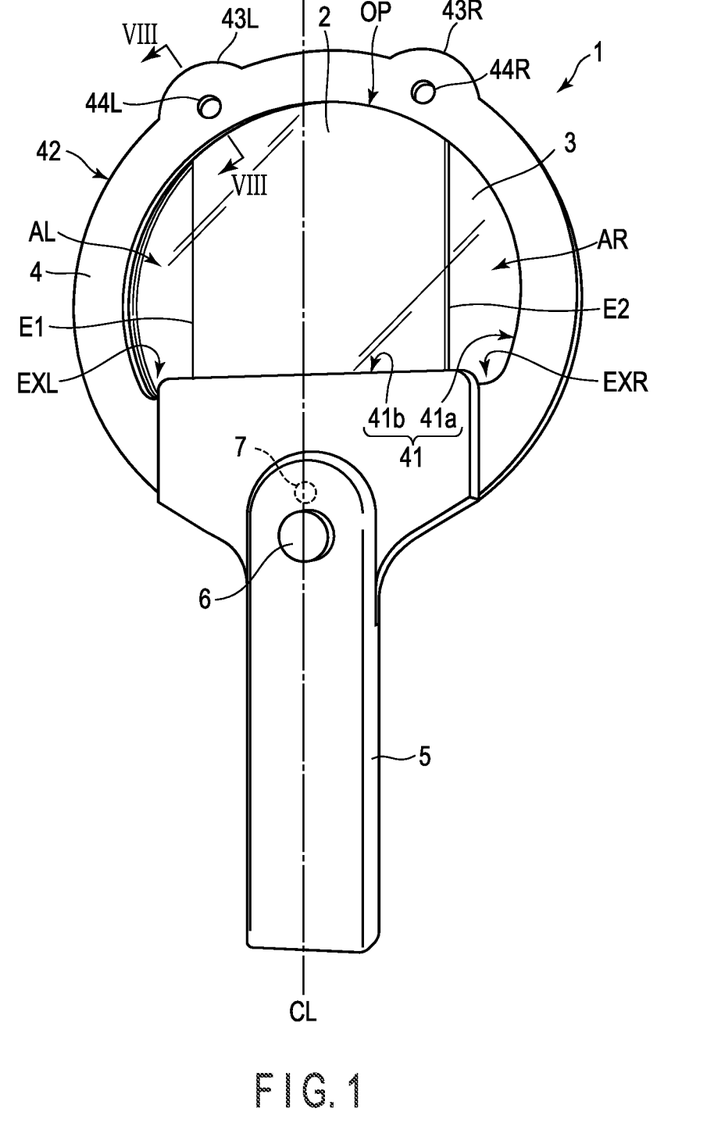
FIG. 1 is a schematic perspective view showing a display device according to one of the embodiments.

FIG. 1 is a schematic perspective view showing a display device 1 according to the present embodiment. The display device 1 shown in this drawing has a bilaterally symmetrical shape with respect to the center line CL, but is not limited to this example. In the following descriptions, a surface of the display device 1 shown in FIG. 1 is referred to as a front surface, and a surface on the opposite side is referred to as a back surface. In addition, viewing the display device 1 and each part of the display device 1 from the front surface side is referred to as a planar view.

The display device 1 comprises a display panel 2, a cover member 3, a frame 4, a grip 5, a switch 6, and a detection device 7. The grip 5 has, for example, a rod shape and extends from the frame 4 to a lower side of the drawing along the center line CL.

The frame 4 includes an inner edge 41 defining an opening OP, an arc-shaped outer edge 42, a pair of protruding portions 43L and 43R protruding from the outer edge 42, and a pair of auxiliary openings 44L and 44R. The inner edge 41 includes an arc portion 41a and a straight portion 41b that intersect the display panel 2. The auxiliary opening 44L is located between the protruding portion 43L and the arc portion 41a. The auxiliary opening 44R is located between the protruding portion 43R and the arc portion 41a. In the example of FIG. 1, the auxiliary openings 44L and 44R have a circular shape, but the shape is not limited to this example. In addition, the auxiliary openings 44L and 44R may be connected to the opening OP.

The opening OP has a shape surrounded by the arc portion 41a and the straight portion 41b. In the example of FIG. 1, the straight portion 41b is located between the opening OP and the grip 5, and both ends of the arc portion 41a are located on a lower side of the drawing than the straight portion 41b (i.e., the grip 5 side). The extended portions EXL and EXR are thereby formed in the opening OP in the vicinity of both ends of the arc portion 41a.

The switch 6 is arranged between the grip 5 and the opening OP on the front surface side of the display device 1. The detection device 7 is arranged between the grip 5 and the opening OP on the back surface side of the display device 1. The switch 6 and the detection device 7 are located on the center line CL in a planar view.

The display panel 2 has an upper end and a lower end in the drawing held by the frame 4. The display panel 2 has a first side E1 and a second side E2 on a side opposite to the first side E1. For example, the first side E1 and the second side E2 extend in the extending direction of the grip 5 (i.e., the direction orthogonal to the straight portion 41b). In the example of FIG. 1, parts of the first side E1 and the second side E2 are overlaid on the opening OP.

The opening OP includes a first region AL and a second region AR surrounded by the display panel 2 and the frame 4. The first region AL is surrounded by the arc portion 41a, a part of the straight portion 41b, and the first side E1, and includes the extended portion EXL. The second region AR is surrounded by the arc portion 41a, a part of the straight portion 41b, and the second side E2, and includes the extended portion EXR. The display panel 2 is located between the first region AL and the second region AR in a planar view. From the viewpoint of ensuring a large region for displaying an image on the display panel 2, the total area of the first region AL and the second region AR is desirably smaller than the area of the display panel 2 overlaid on the opening OP, but is not limited to this example.

The cover member 3 is arranged more closely to the front surface side of the display device 1 than the display panel 2. The cover member 3 covers the entire opening OP and its peripheral edge is held by the frame 4. The cover member 3 is formed of, for example, a transparent resin material or glass. In addition, the display panel 2 is a transparent liquid crystal panel whose background is visible. Therefore, the user can view the back surface side of the display device 1 through the opening OP.

The display panel 2 and the cover member 3 are also overlaid on the auxiliary openings 44L and 44R. Therefore, the user can visually recognize the back surface side of the display device 1 through the auxiliary openings 44L and 44R.

Figure 2:
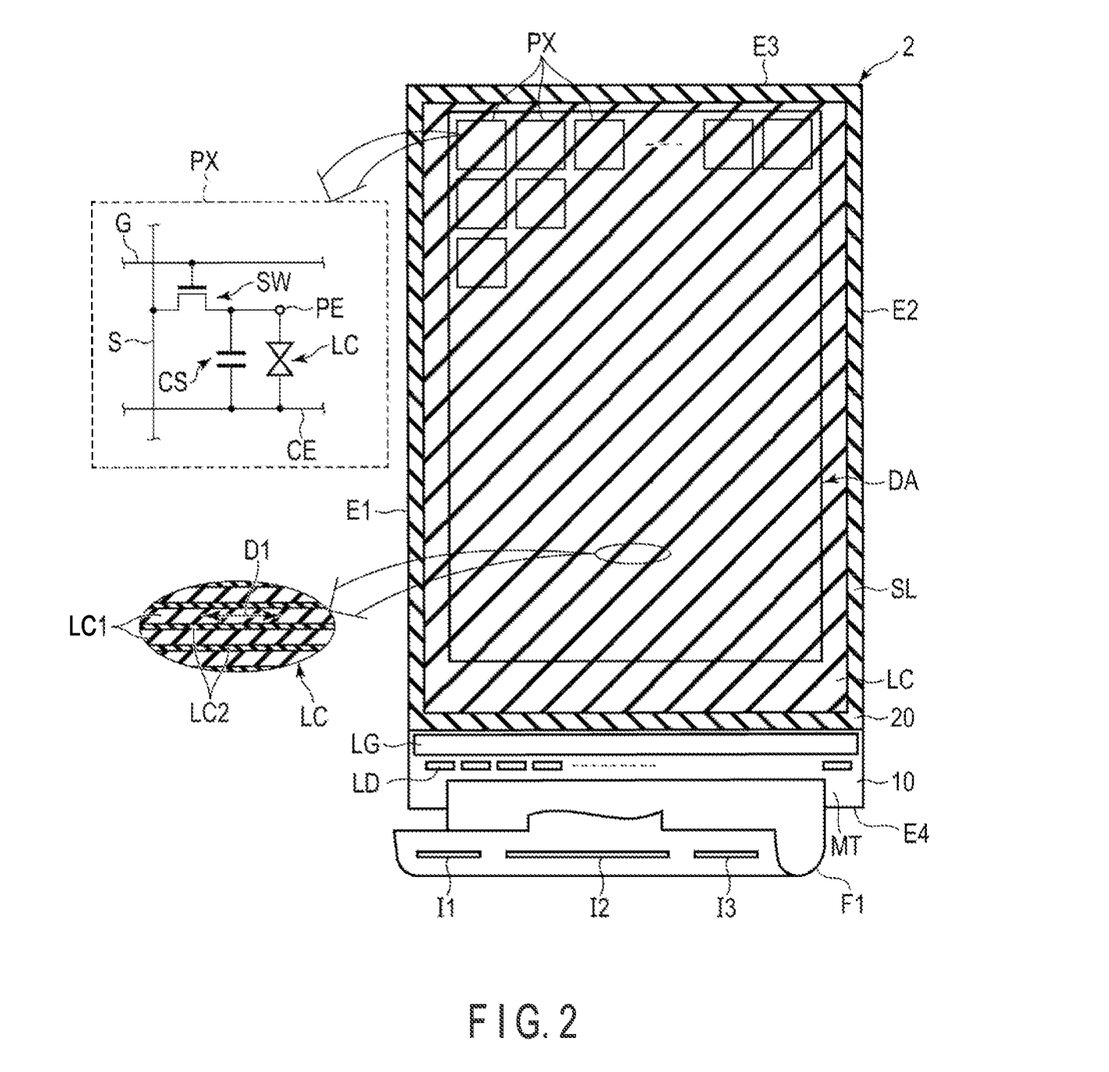
FIG. 2 is a plan view showing a configuration example of a display panel shown in FIG. 1.

FIG. 2 is a plan view showing a configuration example of the display panel 2 shown in FIG. 1. In a planar view, the display panel 2 has a third side E3 and a fourth side E4 on a side opposite to the third side E3 in addition to the above-described first side E1 and second side E2. The third side E3 and the fourth side E4 extend in directions different from the first side E1 and the second side E2 (i.e., orthogonal directions in the present embodiment).

In the present embodiment, the display panel 2 employs a transparent display through which the other side of the panel (a landscape, an object, a person, or the like located on the other side of the panel) can be visually recognized through the panel display surface. More specifically, the display panel 2 comprises a transparent substrate 10 (first transparent substrate), a transparent substrate 20 (second transparent substrate), a liquid crystal layer LC, and a sealant SL. The transparent substrate 10 and the transparent substrate 20 are adhered by the sealant SL. The liquid crystal layer LC is held between the transparent substrate 10 and the transparent substrate 20 and is sealed by the sealant SL. In FIG. 2, the liquid crystal layer LC and the sealant SE are represented by different hatch lines.

As enlarged in FIG. 2, the liquid crystal layer LC comprises polymer dispersed liquid crystal containing polymer LC1 and liquid crystal molecules LC2. For example, the polymer LC1 is liquid crystal polymer. The polymer LC1 is formed in a stripe shape extending in one direction. The third side E3 and the fourth side E4 extend in the extending direction D1 of the polymer LC1. The liquid crystal molecules LC2 are dispersed in gaps of the polymer LC1. The liquid crystal molecules LC2 are initially aligned such that their long axes are oriented along the extending direction of the polymer LC1.

For example, the orientation of alignment of the polymer LC1 is hardly varied irrespective of the presence or absence of the electric field. In contrast, the orientation of alignment of the liquid crystal molecules LC2 is varied in accordance with the electric field in a state in which a voltage higher than or equal to a threshold value is applied to the liquid crystal layer LC. When no voltage is applied to the liquid crystal layer LC, the optical axes of the respective polymer LC1 and liquid crystal molecules LC2 are parallel to each other, and the light incident on the liquid crystal layer LC is hardly scattered and is transmitted in the liquid crystal layer LC (transparent state). When a voltage is applied to the liquid crystal layer LC, the optical axes of the respective polymer LC1 and liquid crystal molecules LC2 intersect each other, and the light incident on the liquid crystal layer LC is scattered in the liquid crystal layer LC (scattering state).

The display panel 2 comprises a display part DA where an image is displayed. The display part DA includes a plurality of pixels PX arrayed in a matrix. Each pixel PX comprises a switching element SW, a pixel electrode PE, a common electrode CE, a liquid crystal layer LC, and the like. The switching element SW is electrically connected to a scanning line G and a signal line S. The pixel electrode PE is electrically connected to the switching element SW. The liquid crystal layer LC (particularly, liquid crystal molecules LC2) is driven by an electric field produced between the pixel electrode PE and the common electrode CE. A capacitor CS is formed between, for example, an electrode of the same electric potential as the common electrode CE and an electrode of the same potential as the pixel electrode PE.

A wiring board F1 is mounted on a mounting portion MT provided on the transparent substrate 10. IC chips I1, I2, and I3 are mounted on the wiring board F1. For example, the IC chips I1 and I3 incorporate gate drivers and are electrically connected to the scanning line G. The IC chip I2 incorporates a display driver and is electrically connected to the signal line S.

A plurality of light emitting elements LD and a light guide member LG are provided in a light source unit 8 to be described later. Each of the light emitting elements LD and the light guide member LG are overlaid on the transparent substrate 10 in a planar view. The plurality of light emitting elements LD are arranged at intervals along the extending direction D1 of the polymer LC1. The light guide member LG is provided between the light emitting elements LD and the transparent substrate 20 in a planar view.

Figure 3:
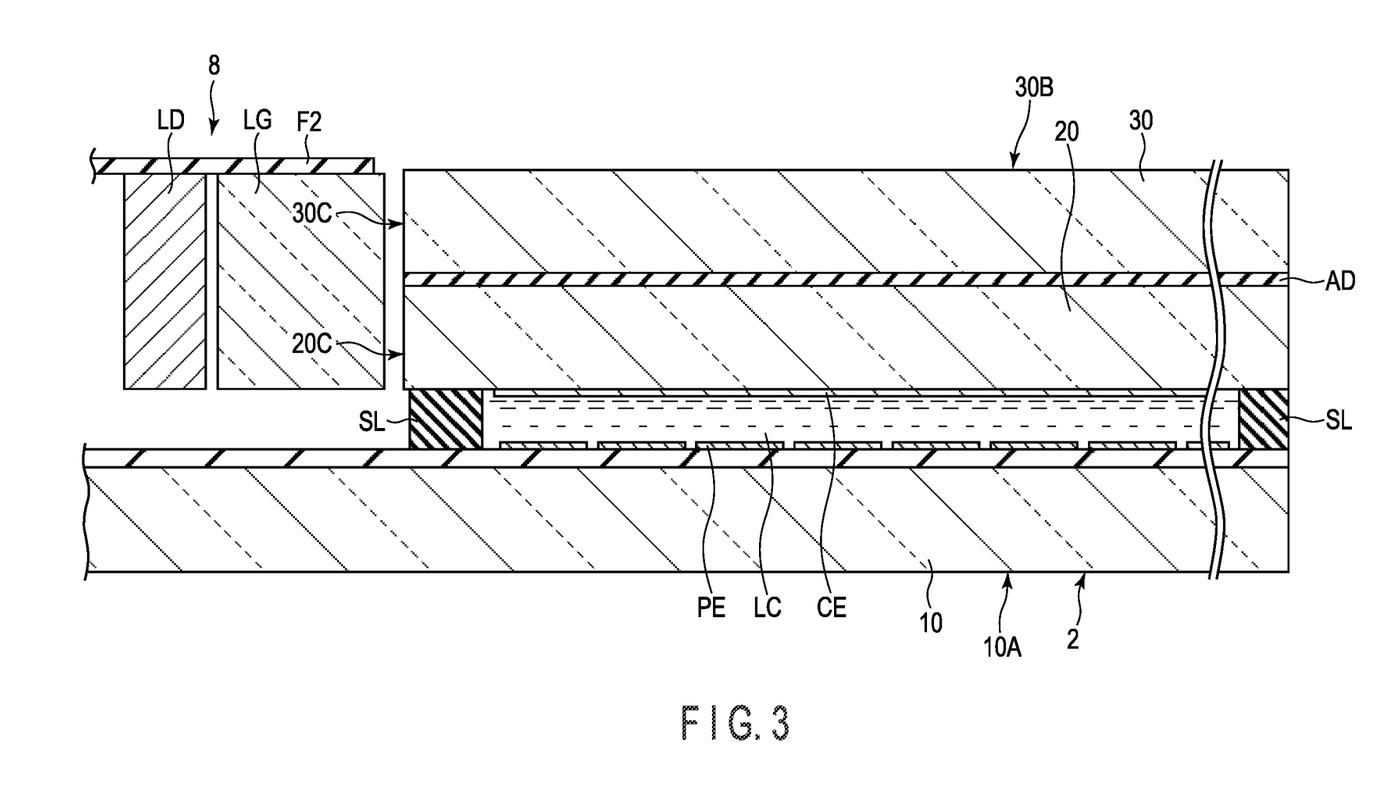
FIG. 3 is a cross-sectional view showing a configuration example of the display panel shown in FIG. 2.

FIG. 3 is a cross-sectional view showing a configuration example of the display panel 2 shown in FIG. 2. Incidentally, only main parts of the display panel PNL are illustrated, and illustration of the switching element SW, the scanning line G, the signal line S, an alignment film that covers the pixel electrode PE, an alignment film that covers the common electrode CE, and the like is omitted. In the illustrated configuration example, the display panel 2 further includes a transparent substrate 30. The transparent substrate 30 is adhered to the transparent substrate 20 with a transparent adhesive layer AD. The transparent substrate 10, the transparent substrate 20, and the transparent substrate 30 are insulating substrates such as glass substrates and plastic substrates, and have equivalent refractive indexes. The transparent substrate 20 includes a side surface 20C, and the transparent substrate 30 includes a side surface 30C.

The light source unit 8 is provided beside the transparent substrate 20. The light source unit 8 comprises a wiring board F2 in addition to the above-described light emitting elements LD and light guide member LG. The light emitting elements LD are mounted on the wiring board F2. The light guide member LG is adhered to the wiring board F2. The light emitting elements LD face the side surfaces 20C and 30C with the light guide member LG interposed therebetween.

The light emitting elements LD emit light toward the side surfaces 20C and 30C. The light emitted from the light emitting elements LD is made incident on the transparent substrate 20 from the side surface 20C and is also incident on the transparent substrate 30 from the side surface 30C. The light incident on the transparent substrates 20 and 30 travels inside the display panel 2 while being repeatedly reflected. The light incident on the liquid crystal layer LC to which no voltage is applied is transmitted through the liquid crystal layer LC while hardly scattered. In addition, the light incident on the liquid crystal layer LC to which the voltage is applied is scattered in the liquid crystal layer LC. The display panel 2 can be observed not only from the main surface 10A side of the transparent substrate 10, but also from the main surface 30B side of the transparent substrate 30. In addition, the background of the display panel 2 can be visually recognized through the display panel 2 regardless of whether the display panel 2 is observed from the main surface 10A side or the main surface 30B side.

Figure 4:
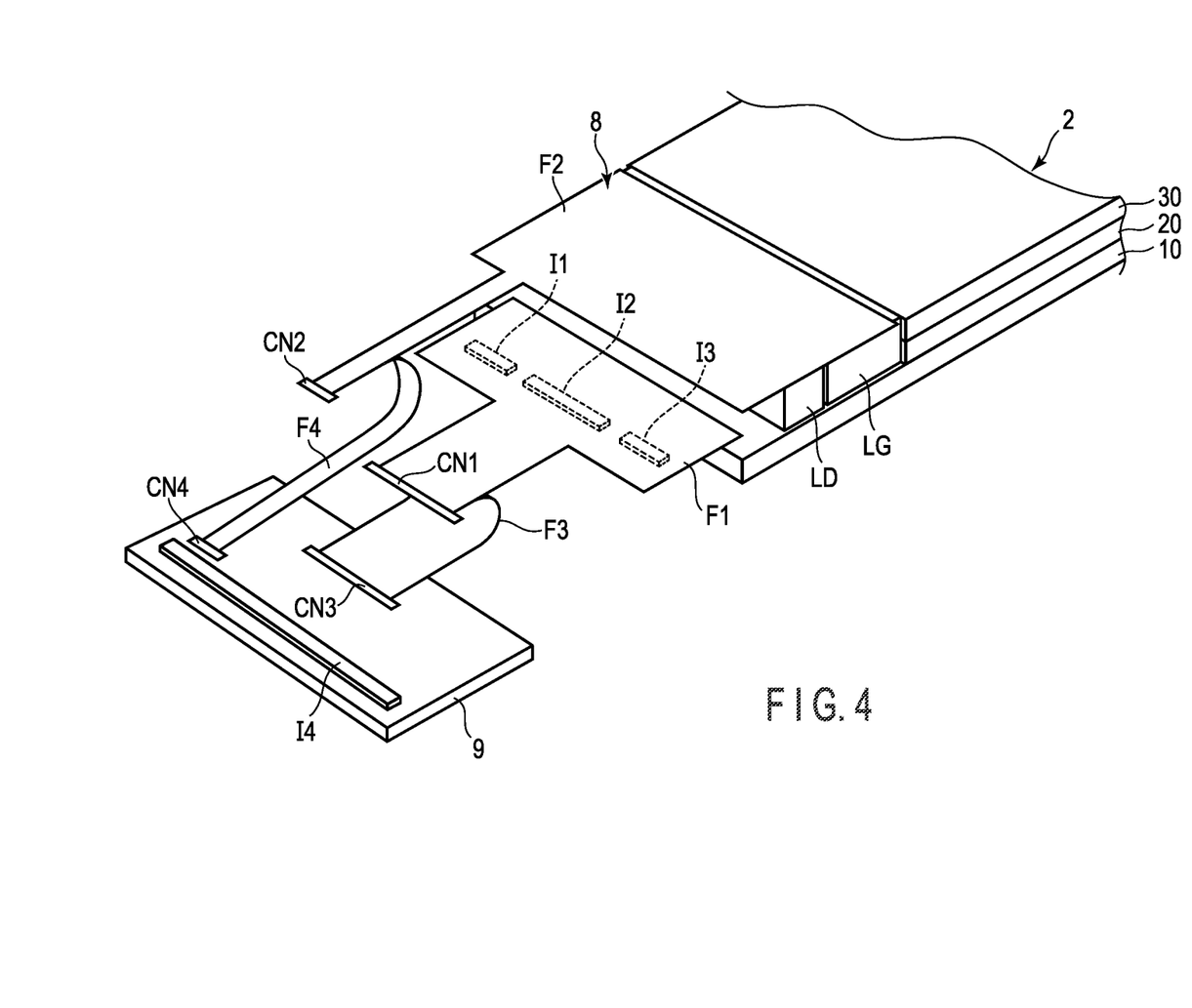
FIG. 4 is a diagram showing a configuration example for connecting the display panel with a circuit board.

FIG. 4 is a diagram showing a configuration example for connecting the display panel 2 with the circuit board 9. On the wiring board F1, the IC chips I1 to I3 are mounted on the surface side opposed to the transparent substrate 10. The light source unit 8 is arranged so as to be overlaid on the transparent substrate 10. The light emitting elements LD and the light guide member LG are located between the transparent substrate 10 and the wiring board F2.

The wiring board F1 is electrically connected to a wiring board F3 via a connector CN1. The wiring board F2 is electrically connected to a wiring board F4 via a connector CN2. The wiring board F3 is electrically connected to a circuit board 9 via a connector CN3. The wiring board F4 is electrically connected to the circuit board 9 via a connector CN4. The IC chip 14 is mounted on the circuit board 9. The IC chip 14 incorporates a display control unit that controls the display panel 2, a light source control unit that controls the light source unit 8, and the like.

The wiring boards F1 to F4 are foldable boards. The circuit board 9 is, for example, a harder board than the wiring board F1 and the like.

Figure 5:
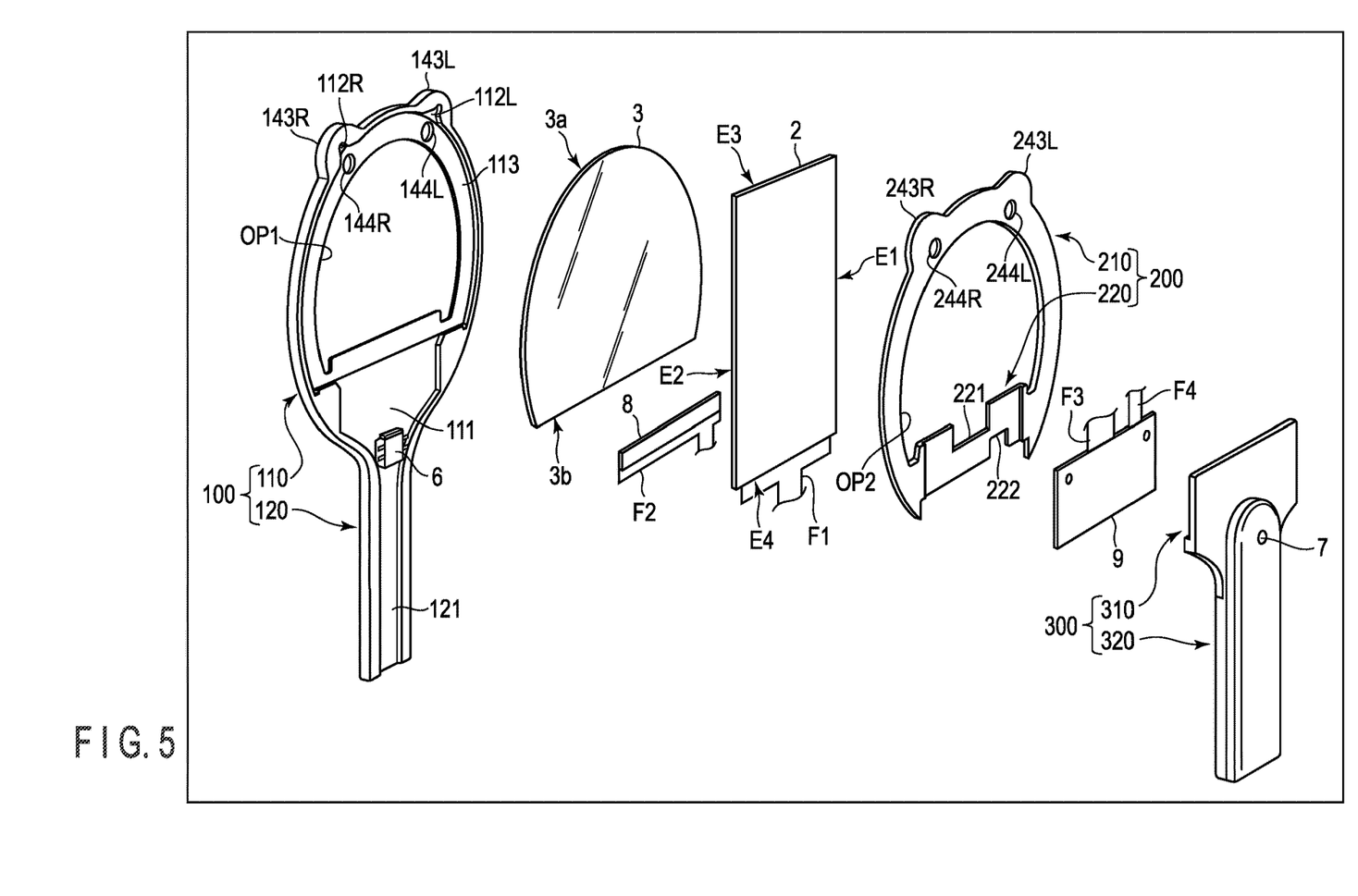
FIG. 5 is a schematic exploded perspective view showing the display device viewed from the back side.
Figure 6:
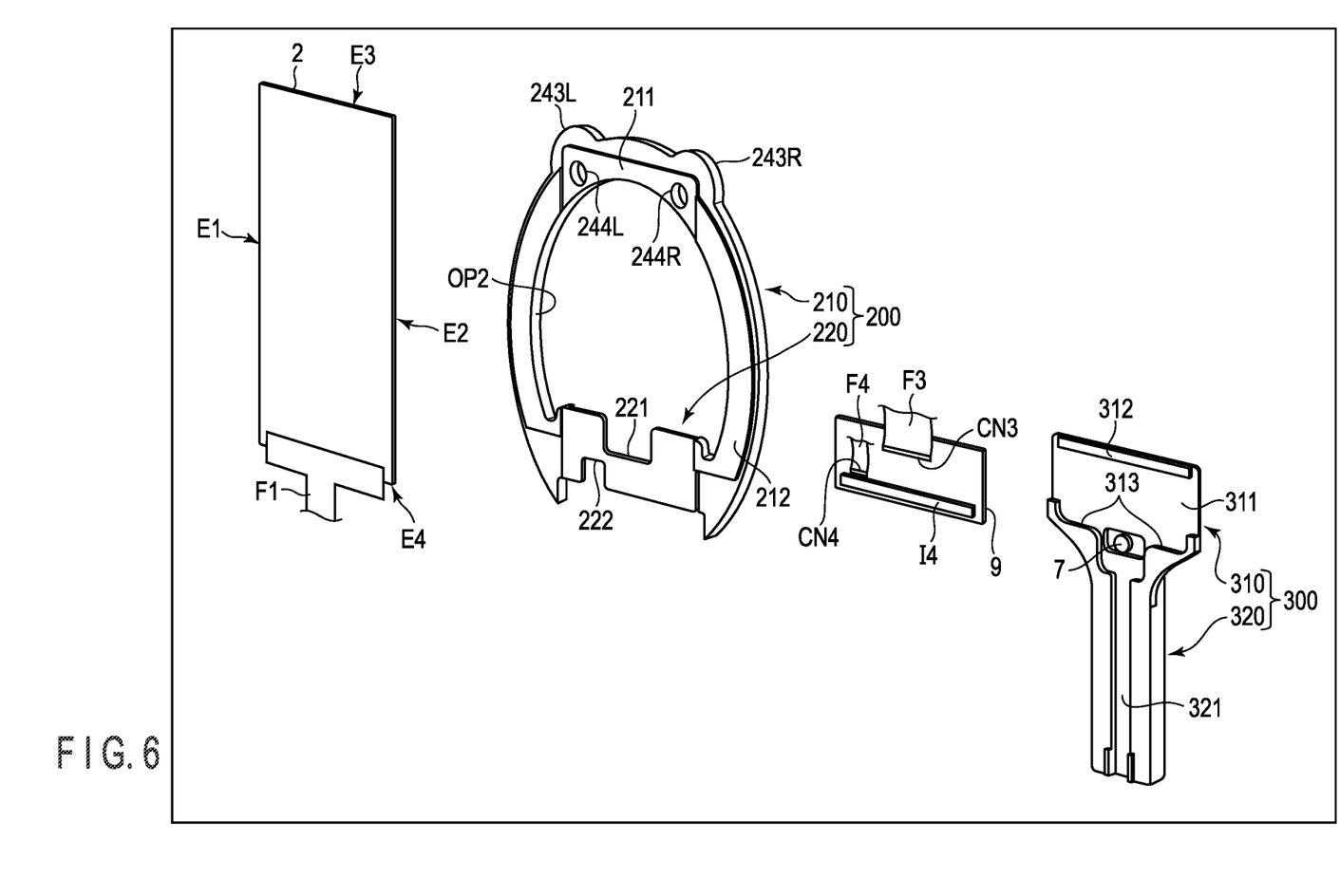
FIG. 6 is a schematic exploded perspective view showing the display device viewed from the front side.

FIG. 5 and FIG. 6 are schematic exploded perspective views showing the display device 1. FIG. 5 mainly shows the configuration of the back surface side of each element, and FIG. 6 mainly shows the configuration of the front surface side of each element. In addition, some of the elements shown in FIG. 5 are omitted in FIG. 6.

As shown in FIG. 5, the display device 1 comprises a first member 100, a second member 200, and a third member 300 in addition to the elements shown in FIG. 1 and the like. The first member 100, the second member 200, and the third member 300 are formed of, for example, metal, but may be formed of the other material such as resin.

The first member 100 comprises a first frame 110 and a first grip 120. The second member 200 comprises a second frame 210 opposed to the first frame 110 and a spacer 220. The third member 300 comprises a cover 310 opposed to the spacer 220 and a second grip 320 opposed to the first grip 120. The frame 4 shown in 1 is composed of the first frame 110 and the second frame 210. The grip 5 shown in FIG. 1 is composed of the first grip 120 and the second grip 320.

The first frame 110 comprises an opening OP1, protruding portions 143L and 143R, and auxiliary openings 144L and 144R. The second frame 210 comprises an opening OP2, protruding portions 243L and 243R, and auxiliary openings 244L and 244R. The above-described opening OP is composed of the openings OP1 and OP2. The above-described protruding portion 43L is composed of the protruding portions 143L and 243L. The above-described protruding portion 43R is composed of the protruding portions 143R and 243R. The above-described auxiliary opening 44L is composed of the auxiliary openings 144L and 244L. The above-described auxiliary opening 44R is composed of the auxiliary openings 144R and 244R.

The display panel 2 is arranged between the cover member 3 and the second frame 210. In the present embodiment, the display panel 2 has a rectangular shape surrounded by the sides E1 to E4, but the shape is not limited to this example. The light source unit 8 is arranged near the fourth side E4 and has a shape elongated along the fourth side E4.

The cover member 3 is arranged between the first frame 110 and the display panel 2. The cover member 3 has, for example, a shape obtained by cutting a part of a circle, and includes an arc portion 3a and a straight portion 3b. The shape of the cover member 3 is not limited to this example as long as it can close the opening OP shown in FIG. 1. Incidentally, the cover member 3 may be arranged between the display panel 2 and the second frame 210. In addition, the display panel 2 may be sandwiched between two cover members 3.

The first frame 110 includes a recess portion 111 provided between the first grip 120 and the opening OP1, a recess portion 112L provided in the protruding portion 143L, a recess portion 112R provided in the protruding portion 143R, and a recess portion 113 surrounding the opening OP1. The recess portion 113 is deeper than the recess portions 111, 112L, and 112R. The recess portion 111 has a shape in which a lower part of the display panel 2 (i.e., a part close to the fourth side E4), the light source unit 8, and the spacer 220 are fitted. The recess portion 112L has a shape in which a corner part of the display panel 2 formed by the first side E1 and the third side E3 is fitted. The recess portion 112R has a shape in which a corner part of the display panel 2 formed by the second side E2 and the third side E3 is fitted. The rattling of the display panel 2 is restricted by fitting the display panel 2 in the recess portion 111 and the recess portions 112L and 112R.

The recess portion 113 has a shape in which the cover member 3 is fitted. The rattling of the cover member 3 is restricted by fitting the cover member 3 in the recess portion 113.

The difference in depth between the recess portion 113 and the recess portions 112L and 112R is equal to or larger than the thickness of the cover member 3. The depth of the recess portions 112L and 112R is larger than the thickness of the display panel 2.

The first grip 120 includes a groove 121. For example, the groove 121 is linearly provided from the recess portion 111 to a lower end of the first grip 120. The switch 6 is arranged near a boundary between the recess portion 111 and the groove 121.

The spacer 220 is arranged between the display panel 2 and the circuit board 9. The circuit board 9 is arranged between the spacer 220 and the cover 310.

As shown in FIG. 6, the second frame 210 includes a protruding portion 211 provided near the protruding portions 243L and 243R, and a protruding portion 212 surrounding the opening OP2 and further protruding than the protruding portion 211. The protruding portion 211 has a shape in which corner parts located on the protruding portions 243L and 243R are fitted in the recess portions 112L and 112R of the first frame 110, respectively. The upper portion (portion close to the third side E3) of the display panel 2 is held between the first frame 110 and the second frame 210 by fitting the protruding portion 211 in the recess portions 112L and 112R.

The protruding portion 212 has a shape of being fitted in the recess portion 113 of the first frame 110. The cover member 3 is held between the first frame 110 and the second frame 210 by fitting the protruding portion 212 in the recess portion 113.

The spacer 220 has a shape of being fitted in the recess portion 111 of the first frame 110. A space for accommodating the lower portion (i.e., a portion close to the fourth side E4) of the display panel 2 and the light source unit 8 is formed between the first frame 110 and the spacer 220 by fitting the spacer 220 in the recess portion 111.

In the example of FIG. 5 and FIG. 6, the spacer 220 includes a notch 221 provided at a position corresponding to the connector CN3 and a notch 222 provided at a position corresponding to the connector CN4. These notches 221 and 222 allow the spacer 220 to contact the circuit board 9 while avoiding the connectors CN3 and CN4.

As shown in FIG. 6, the cover 310 includes a flat surface 311 opposed to the back surface of the circuit board 9, a ridge 312 provided along the upper edge of the flat surface 311 in the drawing, and a pair of wall portions 313 opposed to the ridge 312. The circuit board 9 is arranged between the ridge 312 and the pair of wall portions 313.

The second grip 320 includes a groove 321. For example, the groove 321 is provided linearly from between the pair of wall portions 313 along the lower end of the second grip 320. The detection device 7 is arranged between the pair of wall portions 313. A straight passage can be formed inside the grip 5 by the grooves 121 and 321. For example, when the display device 1 is connected to an external device by wire, lines can be passed through this passage. Such lines may be connected to, for example, the circuit board 9 or other components inside the display device 1.

Figure 7:
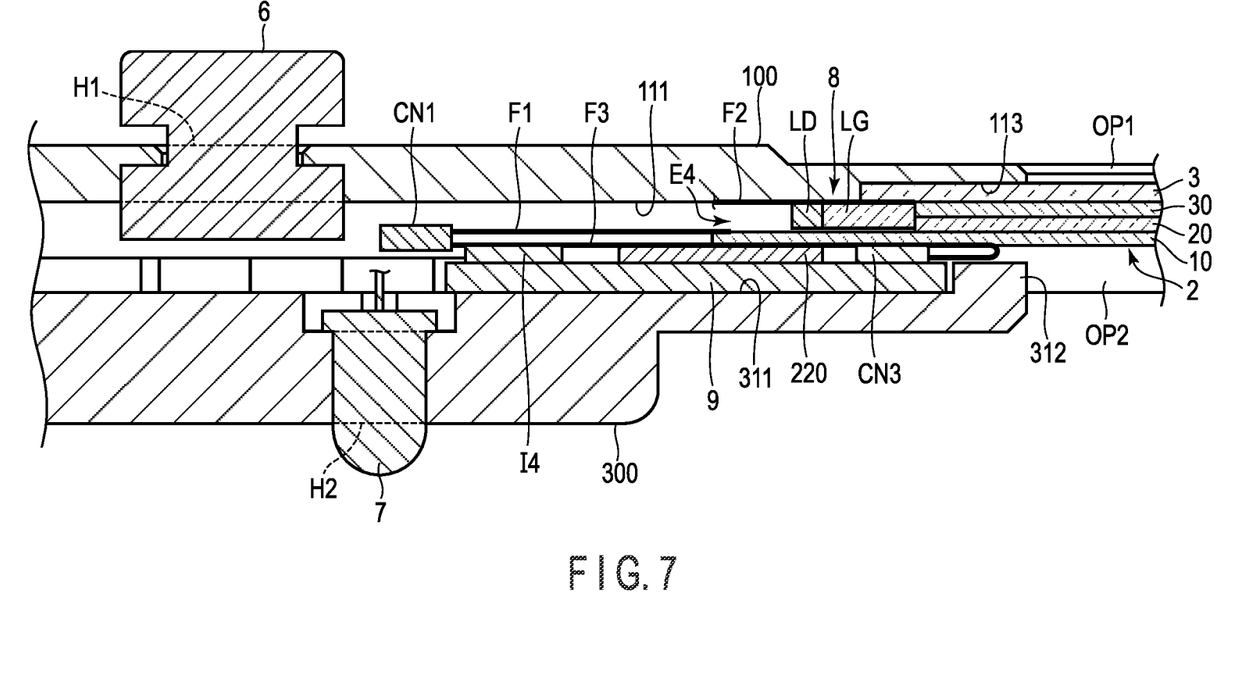
FIG. 7 is a cross-sectional view showing a display device including a switch and a detection device.

FIG. 7 is a cross-sectional view showing the display device 1 including the switch 6 and the detection device 7. A cross-sectional view of the display device 1 along the center line CL shown in FIG. 1 is shown. The vicinity of the fourth side E4 of the display panel 2 is held between the first member 100 and the second member 200 (i.e., between the above-described first frame 110 and second frame 210).

The switch 6, the detection device 7, and the display panel 2 are arranged in this order, from the left side to the right side of the drawing. The switch 6 is provided in a first hole H1 penetrating the first member 100 and protrudes upward from the first member 100 in the drawing. The detection device 7 is provided in the second hole H2 penetrating the third member 300 and protrudes downward from the third member 300 in the drawing.

The circuit board 9 is arranged on the flat surface 311 of the third member 300. The spacer 220 is arranged on the circuit board 9 and is located between the IC chip 14 and the connector CN3. The wiring board F3 is overlaid on the wiring board F1, is arranged between the spacer 220 and the first transparent substrate 10, and is bent between the connector CN3 and the opening OP2.

The cover member 3 is arranged in the recess portion 113 and is overlaid on the transparent substrate 30. The wiring board F2 is arranged between the light guide member LG and the cover member 3, between the light guide member LG and the first member 100, and between the light emitting element LD and the first member 100, and is connected to the connector CN2 (cf., FIG. 4).

The circuit board 9 is opposed to the light source unit 8 via the spacer 220. Furthermore, a part of the circuit board 9 is opposed to the display panel 2 via the spacer 220. The entire circuit board 9 may be opposed to the display panel 2.

Figure 8:
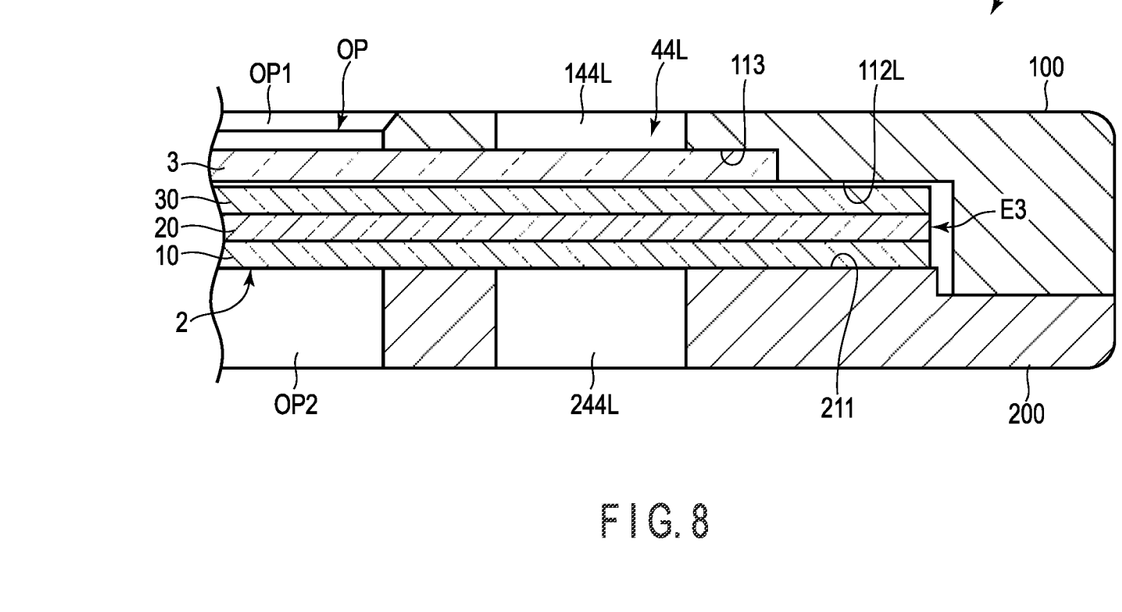
FIG. 8 is a cross-sectional view showing the display panel taken along line VIII-VIII in FIG. 1.

FIG. 8 is a cross-sectional view showing the display panel 1 taken along line VIII-VIII in the vicinity of the protruding portion 43L in FIG. 1. The cover member 3 is arranged between the recess portion 113 of the first member 100 and the display panel 2. The corner part of the display panel 2 configured by the above-described first side E1 and third side E3 is arranged between the recess portion 112L of the first member 100 and the protruding portion 211 of the second member 200.

The display panel 2 and the cover member 3 are interposed between the auxiliary opening 144L and the auxiliary opening 244L. Therefore, the display device 1 can display an image not only in the opening OP but also in the auxiliary opening 44L. Incidentally, the structure in the vicinity of the protrusion 43R is similar to that shown in FIG. 8.

Figure 9:
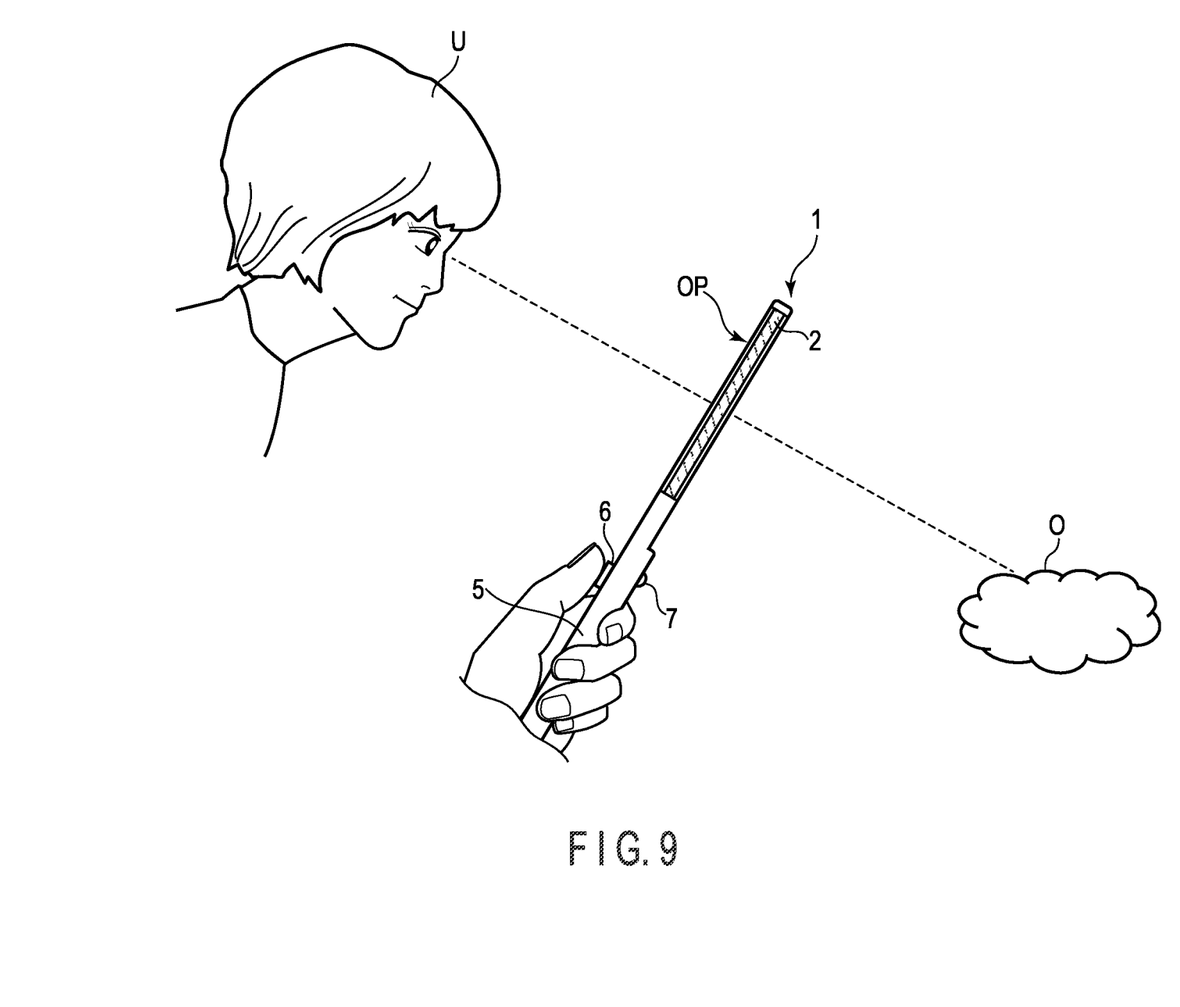
FIG. 9 is a diagram illustrating an example of use of the display device according to the present embodiment.

FIG. 9 is a diagram illustrating an example of use of the display device 1 according to the present embodiment. For example, a user U can hold the grip 5 with one hand and operate the switch 6 with a finger (for example, thumb) of the hand. For example, the switch 6 switches execution and stop of the detection operation of the detection device 7. In addition, the switch 6 switches execution and stop of image display on the display panel 2. The switch 6 may be a mechanical switch whose contacts are turned on/off by being pressed by a finger, a sensor type switch that detects a contact of a finger, or the other type.

The detection device 7 is configured to execute the detection operation of an object O, based on the operation of the user U pressing the switch 6 with a finger or the operation of the user U touching the switch 6 with a finger.

According to the present embodiment, the display device 1 available as a new application can be provided. For example, in the display device 1 according to the present embodiment, the user U operates the switch 6 while observing the object O via the display panel 2, and various types of information such as characters and images relating to the object O are thereby displayed on the display panel 2. That is, various types of information are displayed so as to be overlaid on the real object O, enabling augmented reality (AR) to be supplied to the user U. Such information may be received from the outside by the display device 1 or may be stored in advance in a memory or the like mounted on the circuit board 9.

In recent years, use such as capturing real space with a camera built in a smartphone, adding information to the captured image, and displaying the image on the screen of the smartphone is known. In such a case, the view on the extension of the line of sight of the user who observes the screen often does not match the view displayed on the screen. This is because the capturing region of the camera does not match the line of sight of the user.

According to the present embodiment, when the user U directly faces the object O and observes the display device 1, various types of information are displayed on the line of sight of the user U (i.e., a dotted line connecting the user U with the object O shown in FIG. 9), and a more natural augmented reality can be thereby supplied.

In addition, since the detection device 7 is located between the switch 6 and the opening OP (or the display panel 2), the hand of the user holding the grip 5 so as to be capable of operating the switch 6 by the thumb is hardly overlaid on the detection device 7. For this reason, the detection operation of the detection device 7 is less likely to be disturbed. In addition, since the detection device 7 is provided in the vicinity of the line of sight of the user U (or the display panel 2), the object O which the user U is to observe can easily be focused.

In addition, since the switch 6 and the detection device 7 are arranged on the center line CL of the display device 1, the deviation between the angle of view at which the user U observes the display device 1 and the detection region of the detection device 7 can be inhibited.

Incidentally, the detection device 7 may have directivity to execute the detection operation on the line of sight of the user U.

Figure 10:
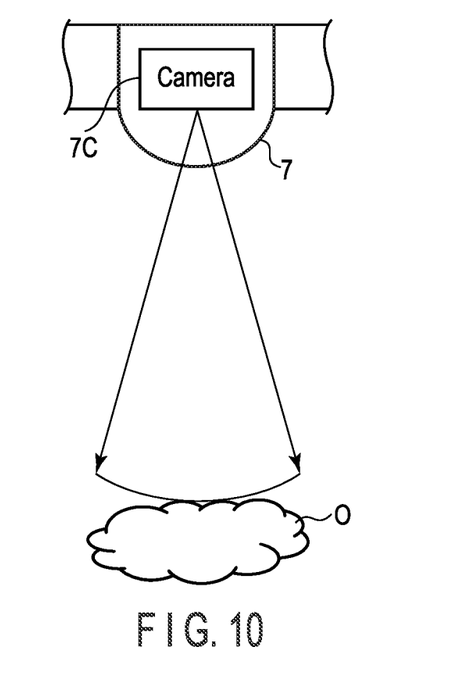
FIG. 10 is a diagram illustrating a configuration example of the detection device.

FIG. 10 is a diagram illustrating a configuration example of the detection device 7. The detection device 7 includes a camera 7C that captures the object O. The detection operation of the detection device 7 having such a configuration includes an operation of capturing the object O by the camera 7C and an operation of recognizing the object O based on the captured image.

Figure 11:
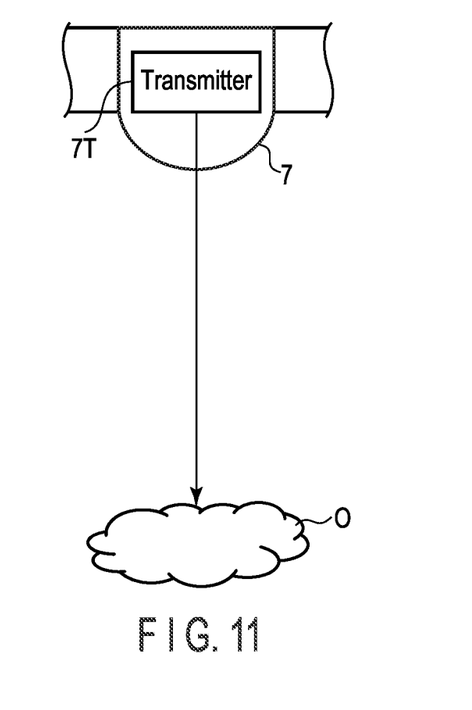
FIG. 11 is a diagram illustrating another configuration example of the detection device.

FIG. 11 is a diagram illustrating another configuration example of the detection device 7. The detection device 7 includes a transmitter 7T that transmits infrared or radio wave signals. The detection operation of the detection device 7 having such a configuration includes an operation of causing an external device to detect the signal transmitted from the transmitter 7T. Incidentally, the external device may be the object O itself or a device installed in the vicinity of the object O. Such an external device is configured to transmit the information to be displayed to the display device 1 by receiving the signal from the transmitter 7T. The transmission of information from the external device to the display device 1 may be wired or wireless.

Figure 12:
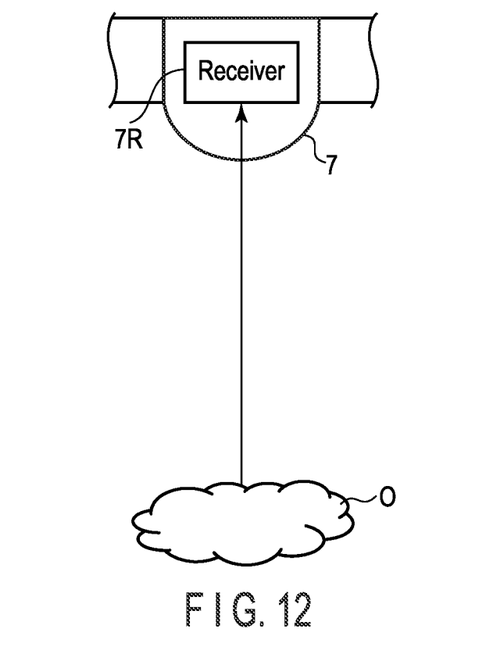
FIG. 12 is a diagram illustrating the other configuration example of the detection device.

FIG. 12 is a diagram illustrating the other configuration example of the detection device 7. The detection device 7 includes a receiver 7R that receives infrared or radio wave signals. The detection operation in the detection device 7 having such a configuration includes an operation of receiving signals from the external device by the receiver 7R. The signals received from the external device include information to be displayed on the display device 1.

Figure 13:
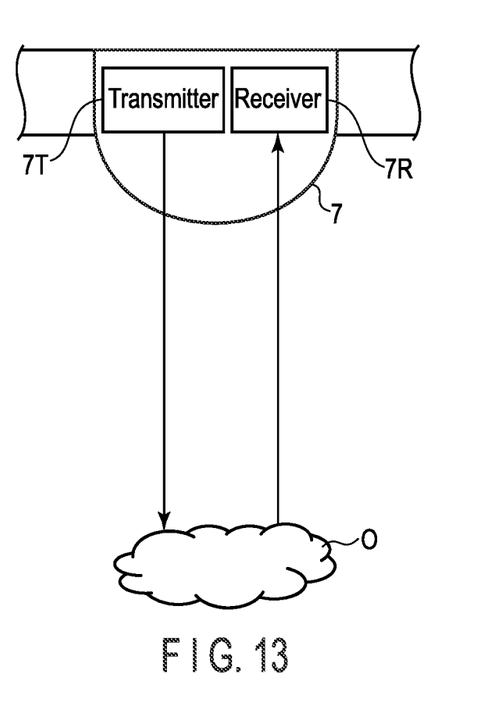
FIG. 13 is a diagram illustrating the other configuration example of the detection device.

FIG. 13 is a diagram illustrating the other configuration example of the detection device 7. The detection device 7 includes both the transmitter 7T and the receiver 7R. The detection operation of the detection device 7 having such a configuration includes an operation of causing an external device to detect a signal transmitted from the transmitter 7T and an operation of receiving a signal from the external device by the receiver 7R. The signals received from the external device include information to be displayed on the display device 1.

As described with reference to FIG. 2, FIG. 3, and the like, when the light from the light source unit 8 is used to display an image on the display panel 2, various restrictions are imposed on the shape of the display panel 2. That is, in consideration of the light reflection on the third side E3, the fourth side E4 and the third side E3 are desirably formed in parallel straight lines in order to make the display characteristics (luminance and the like) of the image uniform on the entire display panel 2. In addition, the first side E1 and the second side E2 are desirably formed as parallel straight lines in order to uniformly reflect the light propagating in the display panel 2 on the first side E1 and the second side E2.

In this respect, when the display panel 2 has a rectangular shape as described in the present embodiment, the display characteristics of the image can be made uniform in the entire display panel 2. In this case, however, the entire opening OP can hardly be covered with the display panel 2 unless the width of the frame 4 is extremely increased. In addition, when the shape of the opening OP is made to match the display panel 2, the area of the opening OP becomes small.

In contrast, in the display device 1 according to the present embodiment, the opening OP includes the first region AL and the second region AL2 surrounded by the display panel 2 and the frame 4. When the display panel 2 is held by the frame 4 such that such regions AL and AR are generated, a large area of the opening OP can be secured.

In addition, it is assumed that the user positions the display device 1 such that the object is located at the center of the opening OP. In this case, when the display panel 2 is located between the first region AL and the second region AR as shown in FIG. 1, the display device 1 can be used without feeling uncomfortable.

In the present embodiment, the opening OP is covered with the cover member 3. The display panel 2 can be protected by the cover member 3. The cover member 3 is held by the frame 4, similarly to the display panel 2, and is not bonded to the display panel 2. If the display panel 2 and the cover member 3 are adhered to each other with an adhesive, the light emitted from the light source unit 8 and propagating through the display panel 2 may not satisfy the total reflection conditions on the surface of the transparent substrate 30 and may leak to the cover member 3. According to the configuration of the present embodiment, such light leakage to the cover member 3 can be prevented.

Leakage light is likely to occur in the vicinity of the fourth side E4 opposed to the light source unit 8 and in the vicinity of the third side E3 on the side opposite to the fourth side E4. In the present embodiment, the vicinities of these sides are blocked by the frame 4. Therefore, the leakage light in the vicinities of these sides can be blocked and the display quality can be improved. In the present embodiment, the vicinity of the fourth side E4 where leakage light and uneven luminance are particularly severe is overlaid on the straight portion 41b of the inner edge 41 of the frame 4 to enhance the light blocking effect in the vicinity of the fourth side E4. In contrast, the vicinity of the third side E3 is overlaid on the arc portion 41a of the inner edge 41 to increase the area of the opening OP.

The opening OP includes extended portions EXL and EXR further protruding toward the grip 5 side than the straight portion 41b, at both ends of the circular arc portion 41a. Thus, the opening OP can be made as close to a circle as possible and the area of the opening OP can be increased.

Furthermore, the outer edge 42 of the frame 4 includes the protruding portions 43L and 43R, and the corner parts of the display panel 2 are held by these protruding portions 43L and 43R. The frame 4 can be thereby made as small as possible. For example, the corner part of the display panel 2 may protrude from the arc-shaped outer edge 42 of the frame 4 excluding the protruding portions 43L and 43R.

Furthermore, since the auxiliary openings 44L and 44R are provided at the protruding portions 43L and 43R, the transparent portion of the entire display device 1 can be widened. Since the auxiliary openings 44L and 44R are overlaid on the display panel 2, an image different from the opening OP can be displayed in the auxiliary openings 44L and 44R. For example, when the switch 6 is operated, when the detection operation is executed by the detection device 7, or at the other time, a specific color may be displayed continuously or intermittently in the auxiliary openings 44L and 44R.

In the present embodiment, the circuit board 9 is opposed to the light source unit 8. Furthermore, a part of the circuit board 9 is opposed to the display panel 2. By thus overlaying the circuit board 9 on the light source unit 8 and the display panel 2, the area of the frame 4 can be reduced. In addition, since a spacer 220 is interposed between the display panel 2 and the circuit board 9, a space for accommodating the display panel 2 and the circuit board 9 can be partitioned between the first member 100 and the third member 300, and the display panel 2 and the circuit board 9 can be held desirably.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a frame defining an opening;
a grip extending from the frame;
a display panel which is held by the frame and a background of the display panel is visually recognizable; and
a light source unit making light incident on the display panel,
wherein the opening includes a region surrounded by an inner edge of the frame and the display panel,
the region includes a first region and a second region,
the display panel is located between the first region and the second region in a planar view,
the display panel includes a first side, a second side opposite to the first side, a third side extending in a direction different from the first side, and a fourth side opposite to the third side,
the first region is surrounded by the inner edge and the first side,
the second region is surrounded by the inner edge and the second side,
the third side and the fourth side are held by the frame, and
the light source unit is arranged along the fourth side.

2. The display device of claim 1, further comprising:
a cover member,
wherein
the cover member is overlaid on the display panel and the region and is held by the frame.

3. The display device of claim 1, wherein the inner edge includes an arc portion and a straight portion which intersect the display panel.

4. The display device of claim 3, wherein
the straight portion is located between the opening and the grip, and
the opening includes an extended portion further protruding toward the grip side than the straight portion.

5. The display device of claim 1, wherein
an outer edge of the frame has an arc shape and includes a protruding portion overlaid on the display panel.

6. The display device of claim 1, wherein
the frame includes an auxiliary opening overlaid on the display panel in addition to the opening.

7. The display device of claim 1, wherein
the frame comprises a first frame and a second frame opposed to the first frame, and
a part of the display panel is held between the first frame and the second frame.

8. The display device of claim 1, further comprising:
a circuit board connected to the display panel,
wherein
at least a part of the circuit board is opposed to the display panel.

9. The display device of claim 8, further comprising:
a spacer arranged between the display panel and the circuit board.

10. The display device of claim 1, further comprising:
a switch arranged between the grip and the opening; and
a detection device executing a detection operation of an object, based on an operation of the switch,
wherein
the detection device is arranged between the switch and the opening, on a side opposite to the switch.

11. The display device of claim 10, wherein
the switch and the detection device are arranged on a center line of the display device.

12. The display device of claim 10, wherein
the detection device includes a camera capturing the object.

13. The display device of claim 10, wherein
the detection device includes at least one of a transmitter transmitting a signal to the object and a receiver receiving a signal from the object.

14. The display device of claim 10, further comprising:
a first member comprising a first frame and a first grip;
a second member comprising a second frame; and
a third member comprising a second grip,
wherein
the first frame and the second frame configure the frame and hold the display panel, and
the first grip and the second grip configure the grip.

15. The display device of claim 14, wherein
the switch is provided in a first hole penetrating the first member, and
the detection device is provided in a second hole penetrating the third member.

16. The display device of claim 1, wherein
the display panel is a transparent display.

17. The display device of claim 1, wherein
the display panel comprises a first transparent substrate, a second transparent substrate opposed to the first transparent substrate, and a liquid crystal layer between the transparent substrates, and
the light source unit is provided beside the second transparent substrate and makes light incident on the second transparent substrate.

* * * * *